UNITED STATES PATENT OFFICE.

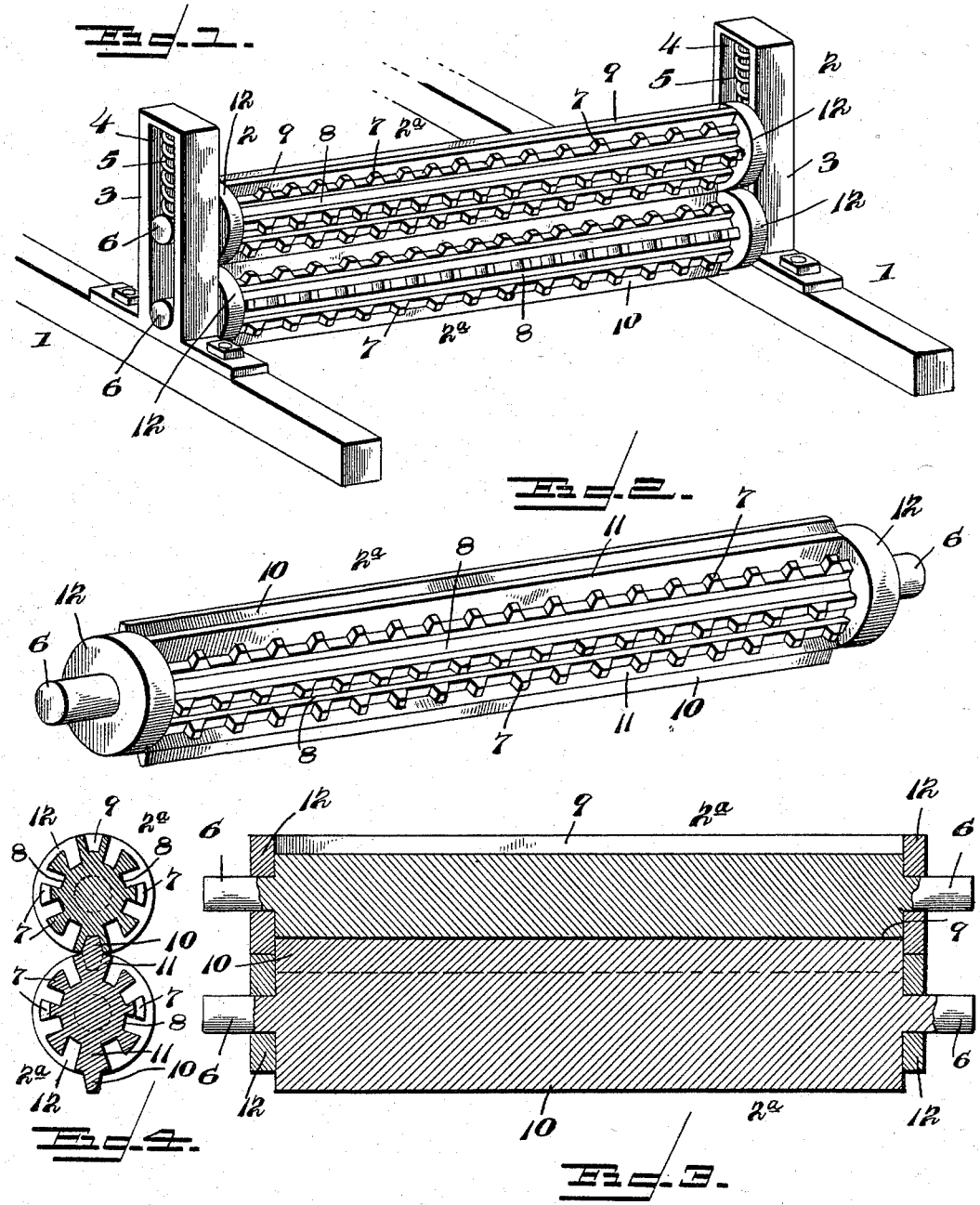

PATRICK H. CONNER AND LEROY CLARK, OF MONTICELLO, IOWA.

HUSKING-MACHINE FEED-ROLL.

SPECIFICATION forming part of Letters Patent No. 527,409, dated October 16, 1894.

Application filed April 24, 1894. Serial No. 508,817. (No model.)

*To all whom it may concern:*

Be it known that we, PATRICK H. CONNER and LEROY CLARK, citizens of the United States, residing at Monticello, in the county of Jones and State of Iowa, have invented a new and useful Husking-Machine Feed-Roll, of which the following is a specification.

The invention is specifically related to that class of corn-husking machines which are adapted to have the corn fed to them while on the stalks, and to husk the corn and reduce the stalks so that they may be used as feed; and it consists of certain improvements in the construction of the feed-rolls, whereby they are made to more effectually feed the corn, and whereby all clogging or choking is prevented.

Our invention further consists of an improvement in the feed-rolls, which improvement renders them susceptible of easier and more complete sharpening; and in improvements for facilitating the better breaking or snapping of the ear of corn off the stalk, directly prior to the operation of the husking devices on the corn.

All of these improvements will be more fully described hereinafter and finally embodied in the claims.

In the drawings: Figure 1 represents a perspective view of the feed-rolls, showing them mounted in their places; Fig. 2, an enlarged perspective view of one of the rolls detached from the machine; Fig. 3, a longitudinal section thereof, taken through both rolls; Fig. 4, a cross-section taken through both rolls.

The reference numeral 1 indicates a portion of the framework of the usual corn-husking machine, and 2 the seats or bearings for receiving the feed-rolls. These bearings are of the usual kind, and consist essentially of the approximately vertical guides 3, provided with longitudinal slots 4, in which the upper feed-roll is journaled, and given a tendency downward and toward its companion by the springs 5. The rolls $2^a$ are each provided with the trunnions 6, whereby they are revolubly mounted.

7 indicates the teeth of the rolls, and these are arranged in longitudinal lines on the rolls, the teeth of each line being out of transverse alignment with those of the adjacent line. Formed longitudinally with the rolls, and one between each line of teeth, are the grooves 8, which extend down into the roll for a distance equal to about the length of the teeth, and are preferably square in cross-section. The purpose of these grooves is to facilitate sharpening the teeth. The teeth of feed-rolls become dull so often that great expense and labor are involved in sharpening them, which has to be done by hand, but with this construction the rolls may be removed and placed in a metal planing or slotting machine and the grooves 8 cut wider, which will effect the desired sharpening.

Husking rolls of the class to which our improvements belong are adapted to snap or break the ears of corn from the stalks as they pass between the rolls, and to attain this end more effectually, we form one roll with the parallel and longitudinal ribs 9 thereon, which are preferably four in number and arranged in two pairs on diametrically opposite sides of the rolls, so that substantially two longitudinal grooves are formed on one of the rolls, and owing to the extended character of the ribs 9 these grooves lie above the plane of the teeth 7. The companion or remaining roll is formed with the two ribs 10 thereon, and these are longitudinally disposed and arranged on opposite sides of the rolls, so that they will mesh with the grooves of ribs 9. These ribs 10 are formed substantially triangular in cross-section, so that they will be capable of meshing with the grooves of the companion roll, in a smooth and frictionless way, and the ribs are formed with the longitudinal base-portions 11, whereby the ribs are projected away from the regular surface of their roll, and so that they may pass into the domain of the grooves of their companion. By the means of this construction the ears of corn are immediately and effectively snapped or broken from the stalks. Formed at each end of the rolls, and concentric therewith, are the flanges 12, which are necessarily circular in shape and which project out so that their peripheries will lie plane with the outer edges of the ribs 9, and with the outer edge of the main or base portions 11, of the ribs 10. These flanges are adapted to engage each other when the rolls are operatively arranged and to hold the teeth thereof from engagement *inter se*, and to place the ribs 9 and 10 in the proper relative positions. Owing to the operation of these flanges 12, the rolls are held apart and space left for the passage of the corn, thereby preventing choking or clogging of this part of the machine.

When the teeth of the rolls become dull and worn, the rolls may be removed and placed in a metal slotting or planing machine; those machines wherein a reciprocating tool is adapted to move against the metal and form grooves or slots therein. The tool of the machine is next made to move between the teeth 7 and in the grooves 8, which will result in the sharpening of the teeth, as hereinbefore explained.

Having described our invention, what we claim is—

1. A feed-roll having a series of teeth formed thereon and arranged in distinct longitudinal lines, and a groove or passage formed on the roll and between each line of teeth, said groove being extended below the base of the teeth and into the roll, in a line radial from the axis of the roll, substantially as described.

2. Feed or snapping rolls for corn-husking machines, and consisting of two co-operating rolls adapted to be arranged parallel with each other and each having a series of teeth thereon for engagement with the corn, one of said rolls having a longitudinal groove therein and in addition to the teeth, and the remaining roll having a similarly-disposed rib in addition to its teeth, the rib being adapted to mesh with the groove on the first roll as they revolve, and to break the ears of corn from the stalks, substantially as described.

3. The combination of two feed-rolls adapted to be arranged alongside each other and to be held into engagement by spring pressure and having teeth thereon for engagement with the corn, said rolls having at their ends continuous concentric flanges extended beyond the ends of the teeth and adapted to engage each other, whereby the teeth of the rolls are held from engagement with each other at all times and whereby they are prevented from chocking, substantially as described.

4. The combination of two feed-rolls for corn-husking machines, said rolls being adapted to lie parallel with each other having teeth thereon for engagement with the corn and having longitudinal grooves and ribs in addition to the teeth and adapted to mesh with each other, and break the corn from the stalks, and each roll having a continuous concentric flange adapted to engage each other and hold the rolls apart and to hold the ribs and grooves in the proper relations, substantially as described.

In testimony that we claim the foregoing as our own we have hereto affixed our signatures in the presence of two witnesses.

PATRICK H. CONNER.
LEROY CLARK.

Witnesses:
A. MATTHIESSEN,
H. GRONEWOLD.